INVENTOR.
ROBERT B. ADAMS
BY
ATTORNEY

United States Patent Office 3,187,763
Patented June 8, 1965

3,187,763
CONTROL APPARATUS
Robert B. Adams, Abington, Pa., assignor to Moore Products Co., Philadelphia, Pa., a corporation of Pennsylvania
Filed Dec. 17, 1962, Ser. No. 245,169
6 Claims. (Cl. 137—81.5)

This invention relates to control apparatus and more particularly to apparatus for controlling fluid flow.

It has heretofore been proposed to make proportioning valves in which the fluid is divided between two outlet connections in proportion to a signal applied to control ports in the valve.

In such valves the flow of fluid is affected not only by pressures at the control ports but also by the pressures or loads existing at the outlet ports. In proportioning valves of the character referred to above back pressures at either outlet port may be transmitted upstream and become effective in the interaction chamber in such manner as to alter the desired proportional distribution.

It is the principal object of the present invention to provide a proportioning valve in which the proportional division of fluid is unaffected within limits by the outlet pressure connection pressure conditions.

It is a further object of the present invention to provide fluid control apparatus in which a buffer zone or stage is provided between the location of proportioning control and the outlet pressure connections to obviate any undesired feedback.

It is a further object of the present invention to provide fluid control apparatus in which accurate control of proportioning can be obtained over a wide range of operating conditions.

It is a further object of the present invention to provide fluid control apparatus in which a fluid jet in an interaction chamber is directed in a controlled manner with a crossover with respect to the axial line of the fluid jet, if desired, and in which a buffer or feedback preventing stage is employed.

It is a further object of the present invention to provide a proportioning valve having an interaction chamber in which the direction of a jet is controlled, the interaction chamber having therebeyond or downstream a fluid crossover or cross passage connection between opposite sides of the jet so that no difference in pressure can be obtained at that location on either side of the jet.

Other objects and advantageous features of the invention will be apparent from the description and claims.

The nature and characteristic features of the invention will be more readily understood from the following description taken in connection with the accompanying drawings forming part thereof, in which.

Figure 1:
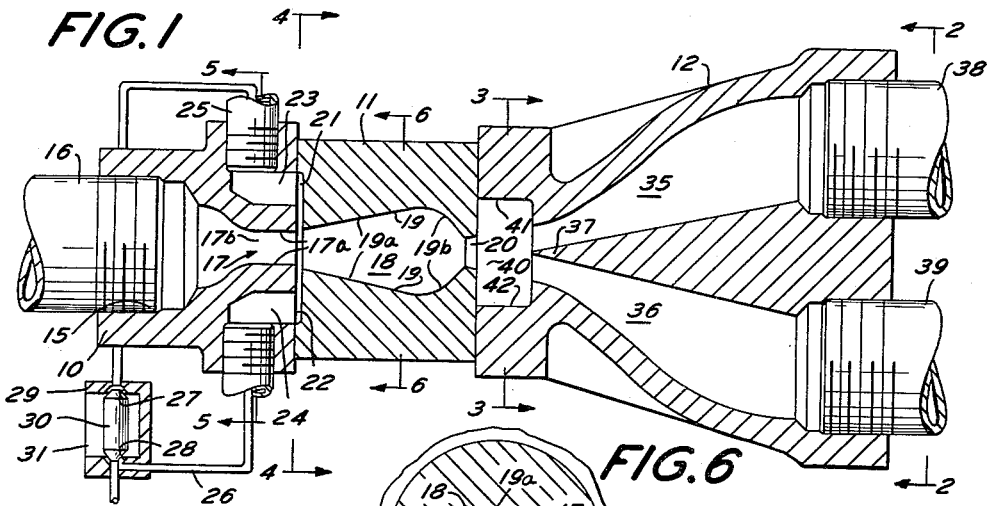
FIGURE 1 is a longitudinal sectional view of a preferred form of proportioning valve in accordance with the invention.
Figure 2:
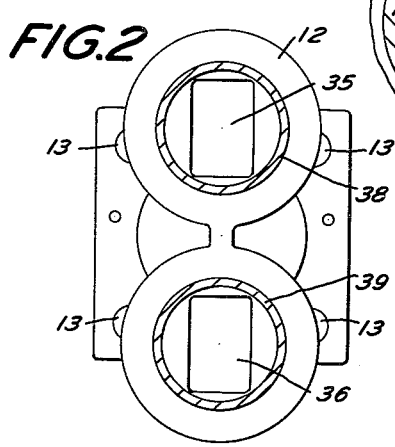
FIG. 2 is an end elevational view as seen from the plane indicated by the line 2—2 of FIG. 1.
Figures 3, 6:
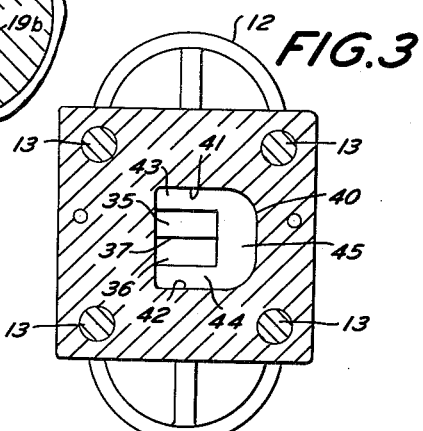
FIG. 3 is a transverse sectional view taken approximately on the line 3—3 of FIG. 1.
FIG. 6 is a transverse sectional view taken approximately on the line 6—6 of FIG. 1.
Figure 4:
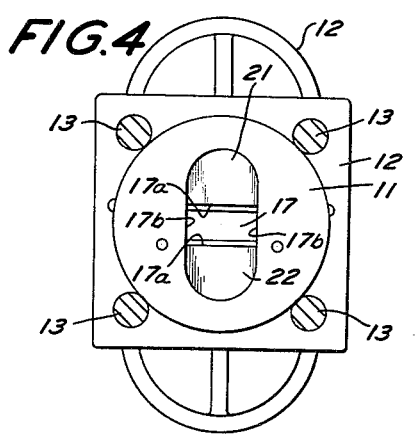
FIG. 4 is a transverse sectional view taken approximately on the line 4—4 of FIG. 1.
Figure 5:
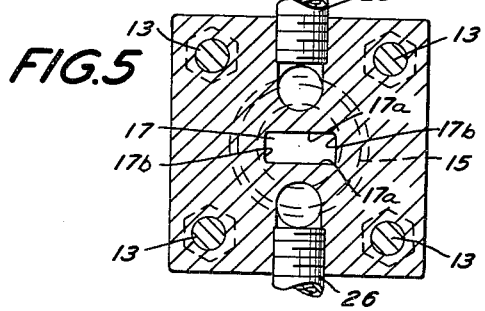
FIG. 5 is a transverse sectional view taken approximately on the line 5—5 of FIG. 1.

It should, of course, be understood that the description and drawings herein are illustrative merely, and that various modifications and changes can be made in the structure disclosed without departing from the spirit of the invention.

Like numerals refer to like parts throughout the several views.

It has heretofore been proposed to control fluid flow by pure fluid interaction devices in which a jet discharges into an interaction chamber having opposite side walls symmetrical with respect to the longitudinal axis of the jet. With control fluid connections extending to opposite sides of the jet contiguous to the outlet of the nozzle, and with the fluid pressure relation which the jet establishes in its relation to the walls the jet can be deflected and directed with relation to a divider to proportion the flow to opposite sides of the divider by controlling the conditions in the control connections. The present invention introduces a new action by which the control action for a given jet and shape of interaction chamber is provided entirely by the action in the interaction chamber. By the interposition of an equalizing chamber just beyond the interaction chamber the effect of pressure conditions or loads downstream and in the delivery connections are eliminated.

Referring now more particularly to the drawings, in which a preferred embodiment of the invention is illustrated, the control apparatus is shown as a proportioning valve with a plurality of aligned body sections. The body sections illustrated include an inlet section 10, an interaction chamber section 11 and a delivery section 12, held in assembled relation by clamping bolts 13.

The inlet section 10 has a fluid inlet connection 15 to which a pipe 16 is connected for delivery of the fluid whose flow is to be proportioned.

The fluid inlet section 10 is provided in the interior thereof with a nozzle or construction 17. The nozzle 17 preferably has opposite pairs of flat side walls 17a and 17b to provide a jet substantially rectangular in cross section into an interaction chamber 18 within the chamber section 11. The interaction chamber 18 is preferably also substantially rectangular in cross section with opposite side walls 19. The side walls 19 preferably have portions 19a shaped so that the jet from the nozzle 17 can be locked thereon by boundary layer effect and portions 19b which direct the jet in offset or angular relation to the straight discharge.

The shaping of the side walls 19 is determined by the requirements of the fluid distribution and the portions 19a may separate as sharply as possible consistent with obtaining good lockon action of the jet, thereby decreasing the overall length required for the reaction chamber 18.

The chamber 18 has a delivery or discharge opening 20 for fluid discharge.

At the entrance to the chamber 18 fluid passageways 21 and 22 are provided. The passageways 21 and 22 can extend outwardly in the interaction chamber section 11 and communicate with fluid connections 23 and 24 respectively in the inlet section 10. Pipes 25 and 26 are connected, respectively, to ports 27 and 28 in a control valve housing 29. The housing 29 has a manually operable valve 30 therein for controlling the ports 27 and 28 and the flow of fluid through the pipes 25 and 26. The inlet 31 to the housing 29 can be connected to the atmosphere, to a source of pressure, or to a source of vacuum, as desired.

The length of the chamber 18, from the nozzle 17 to the opening 20 can be selected as desired. If the ratio of this length to the nozzle width is greater than about 7 with water as the fluid delivered through the pipe 16, a snap action occurs with the jet. For water, and a ratio of about 5 or somewhat less, a proportional action occurs, while with a ratio between these limits the nature of the snap decreases wtih decrease of the ratio.

The delivery section 12 has divided flow discharge or delivery passageways 35 and 36 separated by a divider wall 37 from which pipes 38 and 39 extend.

At or just beyond the exit end of the chamber 18, and at the entrance to the passageways 35 and 36, a buffer zone or equalizing chamber 40 is provided which has opposite side walls 41 and 42 which are preferably set back on each side a distance equal to the width of the delivery opening 20 to provide passageways 43 and 44, a lesser setback can give satisfactory results. The passageways 43 and 44 are connected in any desired manner by a crossover or pressure equalizing connection 45 so that equalization of the pressure in the chamber 40 is effected by the connection 45.

The mode of operation will now be pointed out.

Liquid is supplied through the fluid inlet pipe 16 and fluid inlet connection 15 and is delivered through the nozzle 17 in the form of a jet. If no diverting pressure is effective on the jet it is divided by the leading edge of the divider 37 and part passes into each of the delivery or discharge passageways 35 and 36 and then through the pipes 38 and 39.

Assuming further, as previously pointed out, a ratio of interaction chamber length to nozzle width of five or less, a smooth throttling action will be obtained. The flow can be gradually transferred between the passageways 35 and 36 by movement of the valve 30 with respect to the ports 27 and 28 and thereby controlling the pressure conditions in the pipes 25 and 26 and on each side of the jet at the passageways 21 and 22.

The chamber 40 with its set back side walls 41 and 42 and its connection 45 between the passageways 43 and 44 provides for continuous equalization of pressure on both sides of the jet, after it emerges from interaction chamber 18 and serves as a barrier to effects of downstream conditions. Without this pressure equalizing provision, any pressure difference existing between the passageways 35 and 36, due to downstream pressure conditions would feed back so as to change the angle of deflection of the jet before and after it emerges from interaction chamber 18. In addition, the chamber 40 eliminates the presence of any boundary walls on either side of the jet after it emerges from the interaction chamber 18 and thereby avoids any side wall attractive forces that would further deflect the jet or change its angle, as established in the interaction chamber 18.

I claim:

1. Fluid flow control apparatus comprising a device having a fluid interaction chamber with opposite side walls each with diverging and converging portions, said converging portions extending to opposite sides of a discharge opening at their downstream termini, a nozzle in fixed relation to and communicating with said chamber between said walls, a supply of fluid connected to said nozzle for the delivery of a fluid jet from said nozzle into said chamber, control ports communicating with said chamber at each of said walls and contiguous to said nozzle for determining the positioning of the jet from said nozzle, fluid discharge passageways for receiving the fluid from said said discharge opening, and means providing a barrier to the effects of downstream conditions, said means being downstream of said discharge opening.

2. Fluid flow control apparatus as defined in claim 1 in which said last means includes wall portions set back from said discharge opening.

3. Fluid flow control apparatus as defined in claim 1 in which said last means includes a chamber having wall portions set back from the sides of said discharge opening providing pressure equalizing passageways and a fluid equalizing connection is provided between said pressure equalizing passageways.

4. Fluid flow control apparatus comprising a device having a fluid interaction chamber, a nozzle in fixed relation to and communicating with said chamber, a supply fluid connection to said nozzle for the delivery of a fluid jet from said nozzle into said chamber, said chamber having a discharge opening of lesser cross sectional area than said chamber, means including a fluid passageway communicating with said chamber for determining the direction of the fluid stream issuing from said discharge opening, delivery passageways beyond said discharge opening for receiving fluid from said stream in accordance with the direction of said stream, and means interposed between said discharge opening and said delivery passageway for balancing the pressures on opposite sides of said stream thereby preventing the transmission of pressure unbalances in said delivery passageways from propagating upstream of said discharge opening.

5. Fluid flow control apparatus as defined in claim 4 in which said means for balancing includes wall portions set back from said discharge opening.

6. Fluid flow control apparatus as defined in claim 4 in which said last means includes a chamber having wall portions set back from the sides of said opening providing pressure equalizing passageways, and a fluid equalizing connection is provided between said pressure equalizing passageways.

References Cited by the Examiner

UNITED STATES PATENTS

| 2,228,015 | 1/41 | Neukirch | 137—111 |
| 3,024,805 | 3/62 | Horton | 137—610 |

FOREIGN PATENTS

| 1,278,781 | 11/61 | France. |

LAVERNE D. GEIGER, *Primary Examiner.*